Feb. 21, 1961  R. LANDSTORFER  2,972,712
VOLTAGE REGULATING APPARATUS
Filed July 14, 1959
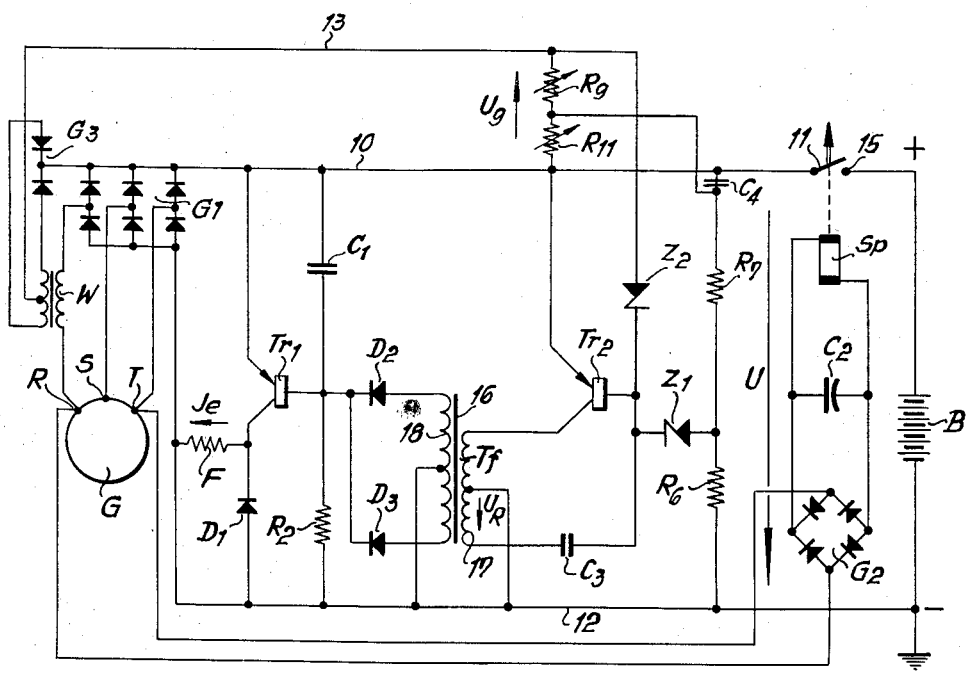
INVENTOR
Rudolf Landstorfer
by:
Michael S. Striker
Attorney _United States Patent Office_

2,972,712
Patented Feb. 21, 1961

2,972,712
VOLTAGE REGULATING APPARATUS

Rudolf Landstorfer, Stuttgart, Germany, assignor to Robert Bosch G.m.b.H., Stuttgart, Germany Filed July 14, 1959, Ser. No. 826,959
Claims priority, application Germany July 19, 1958
5 Claims. (Cl. 322—25)

The present invention concerns an apparatus for automatically regulating the voltage output of an electrical generator in dependence of the current and voltage output thereof, and particularly for regulating the voltage output of generators driven with greatly varying speeds and having a shunt field excitation. Generators of this type are particularly suited for being driven by the internal combustion engines of vehicles and the like for producing the current for the lighting equipment thereof.

It has been proposed to use in regulating apparatus of the type set forth a plurality of transistors, one of which controls the current flowing through the exciter winding of the generator, the other transistor controlling the first transistor in a preselected manner depending upon the current and/or voltage output of the generator at a given moment.

The purpose of regulating apparatus of this kind is to maintain the output voltage across the output lines of the generator at a constant value independent of the varying rotary speeds of the generator, in such a manner that the excitation of the generator is substantially reduced and consequently the output voltage thereof is reduced only when current-consuming devices of so low a characteristic resistance are connected with the generator that the load current taken from the generator would increase beyond a permissible maximum.

It is, therefore, a main object of this invention to provide for a regulating apparatus of the kind set forth which would perform in a more reliable, precise and satisfactory manner than the known devices.

It is a further object of this invention to provide for an apparatus as mentioned which is composed of a comparatively small number of simple and more or less standard components which can be expected to have a comparatively long service life.

With above objects in view, an apparatus for regulating the voltage output of an electric generator which feeds output lines and has a shunt field exciting winding adapted to have exciting current flow therethrough, comprises, according to the invention, a first and a second transistor circuit and transformer means operatively connecting said transistor circuits, said first transistor circuit including a first transistor connected in circuit with said shunt winding for adjusting the exciting current flowing therethrough in accordance with the impedance present in said first transistor at a given moment, and said second transistor circuit including a second transistor connected through said transformer means in circuit with said first transistor and in circuit with at least one of said output lines for varying the impedance of said first transistor in a preselected manner in accordance with the magnitude of the voltage output of said generator at a given moment; and a first and a second Zener diode, the first of said Zener diodes being connected between the base electrode of said second transistor and at least one of said output lines in such a manner that an increasing voltage is applied to said first diode with increasing current output of said generator so that the current output of the latter is controlled thereby, and said second Zener diode being connected between the base of said second transistor and at least one of said output lines in such a manner that an increased voltage is applied to said second diode with increasing voltage output of said generator so that the voltage output of the latter is controlled thereby.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

A preferred embodiment of the invention is illustrated in form of a schematic circuit diagram.

In this example, the regulating apparatus according to the invention is applied to a three-phase generator G, the armature of which may be assumed to be driven by an automobile engine, not shown, having greatly varying rotary speeds. The generator serves for furnishing energy to current consumers, as, for instance, headlights, ignition, etc., of the vehicle and cooperates with the battery B which takes over the supplying of current to the consuming devices when the generator is standing still, but is recharged by the generator when the latter is driven at a sufficiently high rotary speed and when a sufficiently strong exciter current $Je$ flows through the shunt winding F. The magnetic exciter field of the generator must be the stronger, the slower the generator rotates and the greater the output is, provided that the direct current output voltage U of the generator is not to drop below a standardized value of e.g. 24 volts.

The generator G has three output terminals R, S and T. These terminals are connected individually with the junction points of a full-wave rectifier arrangement G1 which is composed of six half-wave rectifiers. The positive output terminals of this rectifier are connected by an output line 10 with the movable arm 11 of a switch device controlled by a voltage coil $Sp$, which, in turn, is connected with a full-wave rectifier G2 in circuit with the two output phases R and T of the generator. The stationary contact 15 cooperating with the switch arm 11 is connected with the positive terminal of the battery B.

The actual regulating apparatus comprises a first transistor $Tr_1$, the emitter-collector circuit of which is connected in series with the shunt winding F of the generator. The other end of this shunt winding is connected to the negative output line 12 which, in turn, is connected with the negative terminal of the battery B and is at the same time connected to electrical ground. The emitter of the first transistor $Tr_1$ is connected to the positive output line 10 while its base electrode is connected via a condenser $C_1$ of approximately 50 $\mu$f. with the positive output line 10, and at the same time via a resistor $R_2$ of approximately 5 kilo-ohm to the negative output line 12. The purpose of this first transistor $Tr_1$ is to change the exciter current $Je$ passing through its emitter-collector circuit periodically between very low and very high values. Since this on-and-off method of regulating results in inductive voltage peaks at the exciter winding F, a silicon rectifier $D_1$ is provided for suppressing such voltage peaks, the excessive currents induced when the exciter current changes from high values to low values, being able to find a by-pass circuit across the rectifier $D_1$.

The average value of the exciter current $Je$ required at a given moment in accordance with the actual speed of the generator and with the actual load is automatically adjusted by means of a control arrangement influencing the potential at the base of the first transistor $Tr_1$. This control arrangement comprises a second transistor $Tr_2$ and as essential components two Zener diodes $Z_1$ and $Z_2$ which are operated, when required, in their blocking direction. As is well known in the art, Zener diodes contain a semi-conductor body composed of highly purified germanium or silicon with the admixture of one foreign atom in proportion to approximately $10^{16}$ atoms of the basic metal which results in a predetermined conductivity of the semi-conductor; by inserting metals of opposite conductivity the semi-conductor is provided with zones of opposite conductivities. Each Zener diode has terminal electrodes soldered to each of the zones of different conductivity. The terminals soldered to zones of the same conductivity in either one of the diodes are all connected with the base of the second or control transistor $Tr_2$. The opposite terminal electrodes of the Zener diode $Z_1$ are connected with the junction point between the resistors $R_6$ and $R_7$ constituting a voltage divider connected between the two output lines 10 and 12. A second voltage divider comprising a resistor $R_9$ and a series-connected variable resistor $R_{11}$ is connected between the output line 10 and a connecting line 13 which leads at one end to the opposite terminals of the Zener diode $Z_2$. The other end of the connecting line 13 is connected to a center tap of the secondary winding of a current transformer W, the primary of which is connected in the connection between the phase terminal R of the generator G and the rectifier $G_1$. The two ends of the secondary of the current transformer W are connected across two half-wave rectifiers $G_3$, respectively, with the positive output line 10.

It should be noted that the Zener diode $Z_1$ serves for regulating the output voltage of the generator depending upon the output voltage thereof, while the Zener diode $Z_2$ serves to regulate the output voltage of the generator G, depending upon its current output.

In circuit between the first transistor $Tr_1$ and the second or control resistor $Tr_2$ is a transformer $Tf$ comprising an iron core 16 with a primary winding 17 and a secondary winding 18 wound around this core. A center tap of the primary 17 as well as a center tap of the secondary 18 are connected with the negative output line 12. The two ends of the secondary 18 are connected via crystal diodes $D_2$ and $D_3$, respectively, with the base of the first transistor $Tr_1$. One end of the primary 17 is connected with the collector of the transistor $Tr_2$ while the other end of the primary 17 is connected via a coupling condenser $C_3$ with the base of the control resistor $Tr_2$.

The above described regulating apparatus operates as follows:

As soon as the generator G after having been at a stand-still is caused to rotate, an initially very small alternating voltage develops at its output terminals R, S and T due to the magnetic remanence existing in its iron parts, and this voltage appears between the output lines 10 and 12 as a direct current voltage of the polarity indicated in the drawing on account of the provision of the above mentioned rectifier $G_1$. Since the first transistor $Tr_1$ is operated without bias voltage, a control current is able to flow from the emitter thereof via the base electrode and the resistor $R_2$ connected with the minus line 12, whereby the transistor $Tr_1$ is rendered conductive and permits an exciter current to flow through the shunt winding F of the generator, so that the excitation already produced through the magnetic remanence is supplemented and an increasing generator output voltage is produced. When the rotary speed of the drive of the generator is sufficiently high, the excitation of the generator is rapidly intensified so as to cause the generator to deliver the standardized output voltage which is sufficient to cause a current to flow through the operating coil $Sp$ of the switching device so as to move the switch arm 11 into its closed position whereby a connection between the positive output line 10 and the positive terminal of the battery B is established. Up to this moment, the control transistor $Tr_2$ remains practically non-conductive. This is due to the fact that the ratio between the resistances of the resistor $R_6$ and the resistor $R_7$ forming a voltage divider between the output lines 10 and 12 is chosen so that the voltage applied to the Zener diode $Z_1$ exceeds the breakdown voltage, and thereby renders this Zener diode conductive, only when the output voltage of the generator G exceeds the standardized output voltage value. When this condition is reached, the control current flowing from the emitter to the base of the second transistor $Tr_2$ and from there via the Zener diode $Z_1$ and the resistor $R_6$ to the negative output line 12 renders the transistor $Tr_2$ conductive so that this transistor is able to carry a strong collector current flowing through one-half of the primary winding 17 of the transformer $Tf$. This collector current produces in the second half of the primary winding 17 a feed-back voltage $U_R$ whereby the conductivity of the control transistor $Tr_2$ is still increased. Since this transistor has a non-linear characteristic, the collector current will initially increase rapidly on account of the above mentioned feed-back, but will then continue to increase only more slowly, the emitter-collector potential difference being practically fixed by the generator output voltage. When the latter condition is reached the polarity of the feed-back voltage $U_R$ changes. Now the feed-back voltage causes the transistor $Tr_2$ to become non-conductive which condition continues until the magnetic field previously produced by the collector current in the iron core 16 of the transformer $Tf$ is dissipated. Now the above described sequence may start again provided that the output voltage of the generator is still above the above mentioned standardized output voltage value causing the Zener diode $Z_1$ to be conductive.

It can be seen that in this manner and on account of the circuit connections shown in the drawing, the transistor $Tr_2$ acts as a self-oscillating unit.

With every one of the blocking oscillation impulses thus produced in the control transistor $Tr_2$, a blocking impulse for the first transistor $Tr_1$ is produced in the two halves of the secondary winding 18. These blocking impulses, one of which is generated during the increase of the collector current, and the next one is generated during the decrease of the collector current flowing through the primary winding 17, are applied alternatingly via the rectifiers $D_2$ and $D_3$ to the condenser $C_1$ and have an energy content of such magnitude that each of these impulses is capable of briefly or temporarily discharging the condenser $C_1$ arranged between the base of the first transistor and the positive output line 10, and may even produce in this condenser a charge of opposite polarity. This results in that the base of the first transistor $Tr_1$ assumes temporarily and briefly a higher positive potential than the emitter of this transistor. Since under such circumstances no control current can flow from the emitter to the base of this transistor, it is rendered entirely non-conductive and the exciter current flowing through this first transistor is reduced to a very small amount. During each of these only very brief interruptions of the conductivity of the first transistor $Tr_1$, the excitation in the field of the generator is reduced and consequently the generator output voltage drops, but this voltage immediately rises again as soon as the first transistor $Tr_1$ returns to its conductive condition on account of the application of the blocking impulses.

When the generator rotates at slow speeds or if in addition its load due to current consuming devices connected therewith but not shown in the drawing increases substantially, even slowly repeating blocking impulses applied to the transistor $Tr_1$ are sufficient for substantially reducing the excitation of the generator. In such cases, it takes comparatively a long time until the generator output voltage reaches again that value at which the Zener diode $Z_1$ becomes again conductive and causes the control transistor $Tr_2$ to release another blocking oscillation which during its rise as well as during its drop would produce one of the above mentioned blocking impulses in the first transistor $Tr_1$. However, when the engine driving the generator G runs at very high speed, and when apart from the battery B only few or no current-consuming devices are connected with the generator, the standardized output value of the generator can be reached only if the average time period of the exciting pulse for the generator would be only $\frac{1}{10}$ or even less than that value which has to be present in the above described case. In the case now under discussion, the time intervals during which the first transistor $Tr_1$ is non-conductive must be substantially longer than those time intervals during which it is conductive and thus causes an increase of the excitation of the generator. Under these conditions, the Zener diode $Z_1$ is rendered only for very brief periods non-conductive or blocking so that the control transistor $Tr_2$ is capable of producing a sequence of blocking oscillations which follow each other so closely that in the intervals between the individual blocking impulses the condenser $C_1$ cannot be charged across the resistor $R_2$ to a condition at which the first transistor $Tr_1$ is rendered conductive.

In order to protect the generator against overload, a second Zener diode $Z_2$ is provided according to this invention. This second Zener diode is rendered conductive independently of the magnitude of the voltage existing between the output lines 10 and 12, only when due to high loads on the generator caused by a device consuming considerable current, or due to a short-circuit in the consuming network, the alternating current flowing through the line connecting the terminal R of the generator with the rectifier device $G_1$ produces in the secondary winding of the current transformer W so high a voltage that the rectified voltage $U_9$ appearing across the resistors $R_9$ and $R_{11}$ exceeds the breakdown voltage of the Zener diode $Z_2$. This Zener diode $Z_2$ after having become conductive causes the transistor $Tr_2$ to act as an amplifier so that this control transistor, in the same manner as previously described for the voltage regulation, generates self-excited blocking oscillations, each of which generates in the secondary winding 18 of the transformer $Tf$ a couple of blocking impulses which temporarily and briefly block the first transistor $Tr_1$.

The particular advantage of using two Zener diodes in the manner described above, consists in the fact that the regulating operation depending upon voltage conditions takes place completely independently of the regulation based on the intensity of the output current, and vice versa. The drawing shows that the resistor $R_7$ is connected with the junction point between the resistors $R_9$ and $R_{11}$, and that a condenser $C_4$ of several $\mu f.$ is connected between the resistor $R_7$ and the positive output line 10. This just mentioned portion of the circuit is not absolutely necessary since the device would operate also without. However, it has been found that it is highly advisable to use these additional elements in the circuit because in this case a control characteristic is obtained which represents an output voltage between the output lines 10 and 12 which remains for all practical purposes entirely constant even while the load current increases. If desired, it is even possible to increase the variable resistor $R_{11}$ for adjusting the regulating apparatus in such a manner that, up to the moment of reaching the permissible maximum of load current at which the regulating procedure starts, the adjusted voltage U between the output lines 10 and 12 also slightly increases with increasing load current. If the resistor $R_9$ is also variable, as indicated in the drawing, the amount of load current can be adjusted thereby at which the regulation based on the actual value of the output current is to start.

It will be understood that each of the elements described above, or two or more together, may also find a useful application in other types of voltage regulating apparatus differing from the types described above.

While the invention has been illustrated and described as embodied in an apparatus for regulating the voltage output of an electrical generator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for regulating the voltage output of an electrical generator which feeds output lines and has a shunt field exciting winding adapted to have exciting current flow therethrough, in combination, a first and a second transistor circuit and transformer means operatively connecting said transistor circuits, said first transistor circuit including a first transistor connected in circuit with said shunt winding for adjusting the exciting current flowing therethrough in accordance with the impedance present in said first transistor at a given moment, and said second transistor circuit including a second transistor having an input circuit connected in circuit with the output of said generator and having an output circuit connected through said transformer means with said first transistor for producing an output current for varying the impedance of said first transistor, at least a portion of said output circuit of said second transistor being connected to said input circuit thereof for producing self-oscillation in said second transistor appearing in said output circuit thereof; a current transformer and at least one rectifier connected in series with each other in at least one of said output lines fed by said generator; and a first and a second Zener diode, the first of said Zener diodes being connected between the base electrode of said second transistor and the secondary of said current transformer and in circuit with said rectifier in such a manner that an increasing voltage is applied to said first diode with increasing current output of said generator so that the current output of the latter is controlled thereby, and said second Zener diode being connected between the base of said second transistor and at least one of said output lines in such a manner that an increased voltage is applied to said second diode with increasing voltage output of said generator so that the voltage output of the latter is controlled thereby.

2. In an apparatus for regulating the voltage output of an electrical generator which feeds output lines and has a shunt field exciting winding adapted to have exciting current flow therethrough, in combination, voltage divider means including at least a first and a second resistor connected in series with each other between said output lines; a first and a second transistor circuit and transformer means operatively connecting said transistor circuits, said first transistor circuit including a first transistor connected in circuit with said shunt winding for adjusting the exciting current flowing therethrough in accordance with the impedance present in said first transistor at a given moment, and said second transistor circuit including a second transistor having an input circuit connected in circuit with the output of said generator and having an output circuit connected through said transformer means with said first transistor for producing an output current for varying the impedance of said first transistor, at least a portion of said output circuit of said second transistor being connected to said input circuit thereof for producing self-oscillation in said second transistor appearing in said output circuit thereof; a current transformer connected in at least one of said output lines fed by said generator; and a first and a second Zener diode, the first of said Zener diodes being connected between the base electrode of said second transistor and the secondary of said current transformer in such a manner that an increasing voltage is applied to said first diode with increasing current output of said generator so that the current output of the latter is controlled thereby, and said second Zener diode being connected between the base of said second transistor and a junction point between said resistors of said voltage divider means in such a manner that an increased voltage is applied to said second diode with increasing voltage output of said generator so that the voltage output of the latter is controlled thereby.

3. In an apparatus for regulating the voltage output of an electrical generator which feeds output lines and has a shunt field exciting winding adapted to have exciting current flow therethrough, in combination, voltage divider means including at least a first and a second resistor connected in series with each other between said output lines; a first and a second transistor circuit and transformer means operatively connecting said transistor circuits, said first transistor circuit including a first transistor connected in circuit with said shunt winding for adjusting the exciting current flowing therethrough in accordance with the impedance present in said first transistor at a given moment, and said second transistor circuit including a second transistor having an input circuit connected in circuit with the output of said generator and having an output circuit connected through said transformer means with said first transistor for producing an output current for varying the impedance of said first transistor, at least a portion of said output circuit of said second transistor being connected to said input circuit thereof for producing self-oscillation in said second transistor appearing in said output circuit thereof; a current transformer and at least one rectifier connected in series with each other in at least one of said output lines fed by said generator; and a first and a second Zener diode, the first of said Zener diodes being connected between the base electrode of said second transistor and the secondary of said current transformer and in circuit with said rectifier in such a manner that an increasing voltage is applied to said first diode with increasing current output of said generator so that the current output of the latter is controlled thereby, and said second Zener diode being connected between the base of said second transistor and a junction point between said resistors of said voltage divider means in such a manner that an increased voltage is applied to said second diode with increasing voltage output of said generator so that the voltage output of the latter is controlled thereby.

4. In an apparatus for regulating the voltage output of an electrical generator which feeds output lines and has a shunt field exciting winding adapted to have exciting current flow therethrough, in combination, voltage divider means including at least a first and a second resistor connected in series with each other between said output lines; a first and a second transistor circuit and transformer means operatively connecting said transistor circuits, said first transistor circuit including a first transistor connected in circuit with said shunt winding for adjusting the exciting current flowing therethrough in accordance with the impedance present in said first transistor at a given moment, and said second transistor circuit including a second transistor having an input circuit connected in circuit with the output of said generator and having an output circuit connected through said transformer means with said first transistor for producing an output current for varying the impedance of said first transistor, at least a portion of said output circuit of said second transistor being connected to said input circuit thereof for producing self-oscillation in said second transistor appearing in said output circuit thereof; a current transformer connected in at least one of said output lines fed by said generator; second voltage divider means including at least two resistors connected in series with each other between the secondary of said current transformer and one of said output lines, the junction point between said two resistors of said second voltage divider means being connected with the junction point between said first and second resistor of said first voltage divider means; and a first and a second Zener diode, the first of said Zener diodes being connected between the base electrode of said second transistor and the secondary of said current transformer in such a manner that an increasing voltage is applied to said first diode with increasing current output of said generator so that the current output of the latter is controlled thereby, and said second Zener diode being connected between the base of said second transistor and a junction point between said resistors of said voltage divider means in such a manner that an increased voltage is applied to said second diode with increasing voltage output of said generator so that the voltage output of the latter is controlled thereby.

5. In an apparatus for regulating the voltage output of an electrical generator which feeds output lines and has a shunt field exciting winding adapted to have exciting current flow therethrough, in combination, voltage divider means including at least a first and a second resistor connected in series with each other between said output lines; a first and a second transistor circuit and transformer means operatively connecting said transistor circuits, said first transistor circuit including a first transistor connected in circuit with said shunt winding for adjusting the exciting current flowing therethrough in accordance with the impedance present in said first transistor at a given moment, and said second transistor circuit including a second transistor having an input circuit connected in circuit with the output of said generator and having an output circuit connected through said transformer means with said first transistor for producing an output current for varying the impedance of said first transistor, at least a portion of said output circuit of said second transistor being connected to said input circuit thereof for producing self-oscillation in said second transistor appearing in said output circuit thereof; a current transformer and at least one rectifier connected in series with each other in at least one of said output lines fed by said generator; second voltage divider means including at least two resistors connected in series with each other between the secondary of said current transformer and one of said output lines, the junction point between said two resistors of said second voltage divider means being connected with the junction point between said first and second resistor of said first voltage divider means; and a first and a second Zener diode, the first of said Zener diodes being connected between the base electrode of said second transistor and the secondary of said current transformers and in circuit with said rectifier in such a manner that an increasing voltage is applied to said first diode with increasing current output of said generator so that the current output of the latter is controlled thereby, and said second Zener diode being connected between the base of said second transistor and a junction point between said resistors and said voltage divider means in such a manner that an increased voltage is applied to said second diode with increasing voltage output of said generator so that the voltage output of the latter is controlled thereby.

References Cited in the file of this patent

UNITED STATES PATENTS 2,866,944     Zelina  ---------------- Dec. 30, 1958